April 13, 1965     C. D. OAKES     3,177,531
VEHICLE FLOORING MEMBER
Filed March 8, 1962     2 Sheets-Sheet 2
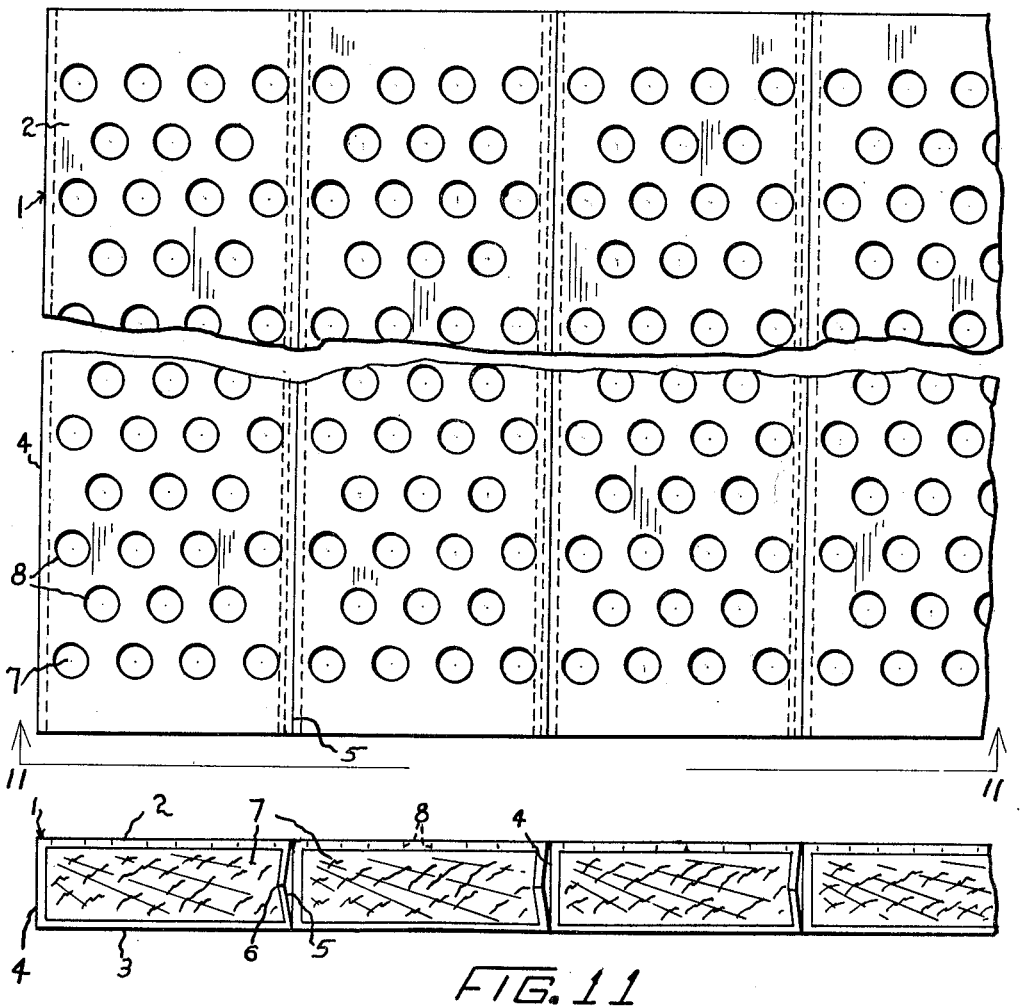
INVENTOR.
CLARENCE D. OAKES
BY Allan J. Murray
ATTORNEY

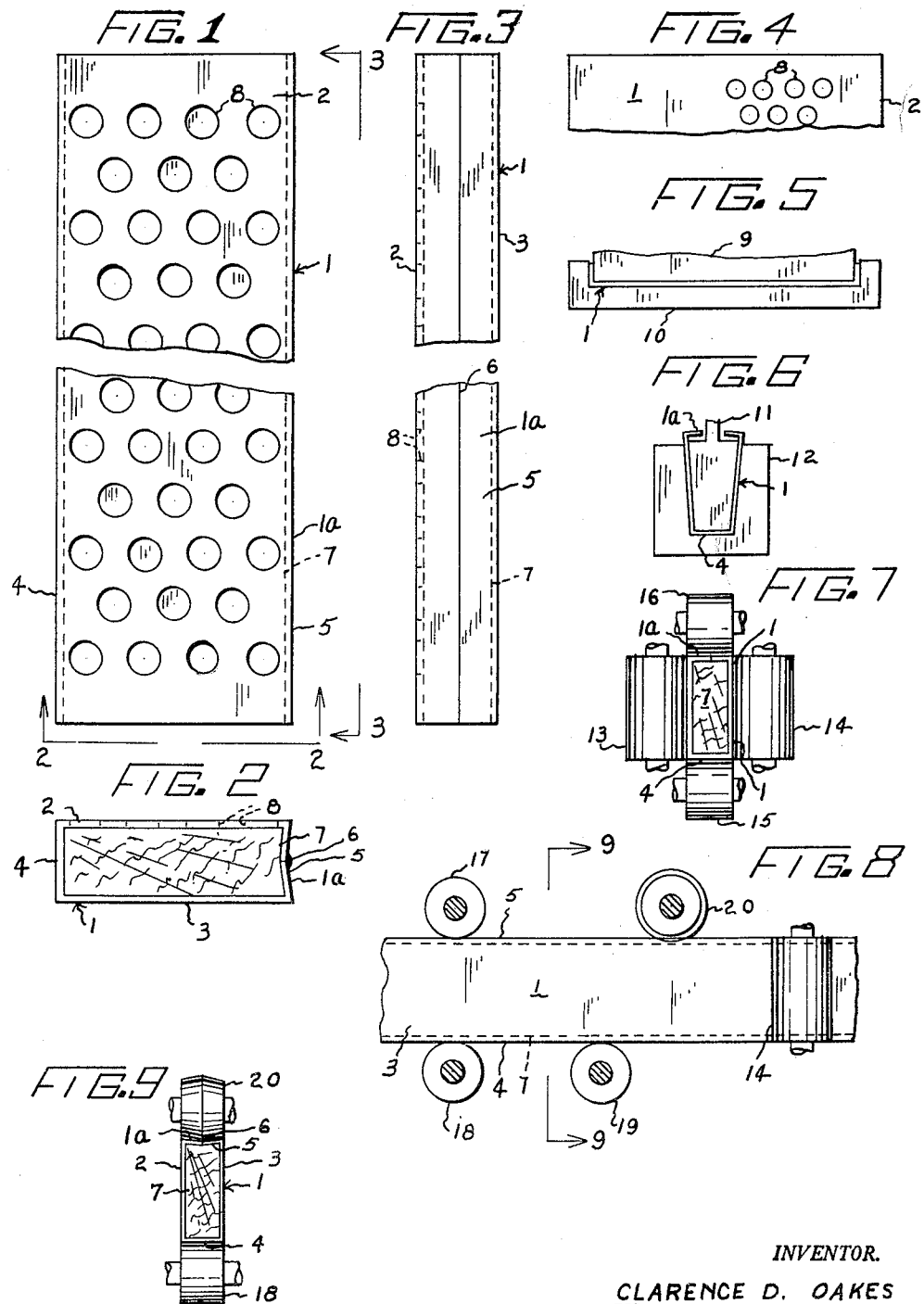

3,177,531
VEHICLE FLOORING MEMBER
Clarence D. Oakes, 3208 Rochester Road, Troy, Mich.
Filed Mar. 8, 1962, Ser. No. 178,362
1 Claim. (Cl. 20—6)

This invention relates to heavy duty flooring members for heavily loadable vehicles such as railroad box cars, and particularly to such flooring members as are designed to receive nails or the like to secure cargo against shifting within a railroad car during travel of such a car. Such nails may secure the cargo, the containers of such cargo, or struts and braces, to resist such shifting.

As heavy vehicles such as fork lift trucks are employed to load heavy cargo into railroad cars, the combined weight of such vehicles and cargo frequently totals a matter of several tons; thus each wheel of a fork lift carrying a load may be supporting as much as a half ton or more. Also, heavy machinery and the like may have its weight supported by legs or runners, each supporting hundreds or thousands of pounds.

Obviously, such flooring members must have great strength to support heavy concentrations of weight in the relatively small areas occupied by said wheels, legs, and runners, etc. It is further desirable that the carrying surface of such flooring provide adequate traction for said vehicles, and that the flooring be of as light weight as possible, yet as durable as possible. It is important that such flooring be of a nature to receive said nails.

An object of this invention is to provide an elongated hollow sheath or casing of strong durable material having a load carrying surface and encasing and being reinforced by a filler of comparatively light weight material.

Another object is to form the load carrying surface of the sheath with perforations to both afford traction to the wheels of a vehicle and to afford insertion of nails or the like into the filler, and to provide a filler of a material to receive such nails.

Still another object is to provide such a member with means to resist longitudinal escape of said filler from said sheath.

Still another object is to provide said means in the form of an inwardly impressed portion of the sheath to engage said filler and resist said escape.

Another object is to assemble a plurality of said flooring members in longitudinally abutting relation to form a floor panel.

These and various other objects are attained by the construction hereinafter described and illustrated in the accompanying drawings, wherein:

FIG. 1 is a top plan view of my improved flooring member.

FIG. 2 is an end elevational view thereof on line 2—2 of FIG. 1.

FIG. 3 is a side elevational view thereof on line 3—3 of FIG. 1.

FIG. 4 is a partial view on a smaller scale of a blank of material from which the sheath is formed, illustrating the stage of said method at which perforations have been formed in said blank.

FIG. 5 is an end view on a still smaller scale of the blank showing a further stage in said method.

FIGS. 6, 7, 8, and 9 are views on the scale of FIG. 5 showing further steps in said method.

FIGURE 10 is a top plan view of a plurality of said members assembled to form a floor.

FIGURE 11 is an end view of said floor on line 11—11 of FIGURE 10.

In these views, the reference character 1 designates an elongated hollow sheath. Such sheath is formed from a flat blank of appropriate material, preferably metal, and has an upper wall 2 and a lower wall 3. As illustrated in FIG. 2, the blank is so bent that its longitudinal center portion forms a side wall 4, while its longitudinal marginal portions 1a are bent to jointly form an opposite side wall 5.

Said marginal portions are bent to position the longitudinal edges of the blank in a substantially abutting relation. Said edges are securely joined together, as by welding, at 6. A filler 7, preferably a length of wood, occupies the interior of the sheath. To secure the filler against longitudinal movement within, and escape from, said sheath, various fastening members could be used, with perforations in the sheath to admit such fasteners to penetrate the filler. However, it is preferred to impress a portion of the sheath inwardly, as for example the side wall 5. This serves to tightly, frictionally engage the inner surface of said sidewall with said filler 7, to resist movement thereof.

It serves further to depress the weld, so that a plurality of such members, as so far described, may be disposed with their sidewalls abutting each other and their upper surfaces in substantially coplanar relation. Such plurality of members may then have their abutting sidewalls welded or otherwise secured together to form a panel of flooring for installation in a railroad car. The means of such installation would be obvious to one skilled in the art, and are hence not described or illustrated herein.

The upper wall, in such installation, will, of course, receive any cargo loaded into a car. Therefore, a plurality of holes 8, is formed in such upper wall. Such holes may vary in number, disposition, shape, and size. Their purpose is to afford traction to the wheels of the aforesaid loading vehicles, and permit employment of nails or the like to secure loaded cargo against shifting.

The preferred method of making the construction entails the steps of first forming the perforations 8, as by use of dies, in the blank as seen in FIG. 4. The longitudinal marginal portions of the blank are then bent at right angles to the plane of the blank as by dies 9 and 10, as shown in end elevation in FIG. 5. As seen in FIG. 6, still another set of dies 11 and 12 may be used to form the blank into an approximate rectangular tube when viewed from one end. The die 11 is raised and the partially formed blank is slid longitudinally therefrom. The filler 7 is inserted in the blank as now formed, and such blank then passes between rollers 13 and 14 which press the upper and lower walls 2 and 3 toward each other. Rollers such as 15 support the sheath 1, while a roller 16 forces the longitudinal marginal portions 1b uniformly downwardly for welding of the abutting edges. Means for effecting said welding are, of course, common, and may be set up as desired.

The welding induces a slight distortion or warping longitudinally of the flooring member, and as aforesaid it is desired to depress the weld, and to engage the filler against escape longitudinally of the sheath. The flooring member is now passed between rollers 17, 18, 19, and 20 (FIG. 8), disposed above and below said member to correct said longitudinal distortion. The roller 20, as best seen in FIG. 9, is designed to also effect said depression of the weld to frictionally engage the side wall 5 with said filler 7, and to afford abutting said side against a side wall of another flooring member to form a panel as aforesaid.

Extensive testing has shown this form of construction to be much stronger and longer lived than any metal-covered wood, vehicle flooring yet devised.

What I claim is:

A floor comprising a plurality of longitudinally abutting members, each such member including an elongated hollow sheet having an upper wall, a lower wall, and having a first and second sidewall, and an elongated filler occupying the interior of such sheet, said upper wall being formed with a plurality of holes to afford increased traction on the exterior surface thereof and to admit fasteners to said filler, said filler being of a nature to receive said fasteners, said sheet being formed from an elongated blank, having the longitudinal edges of the blank in substantially abutting relation whereby the longitudinal marginal portions of the blank jointly form said second sidewall, said abutted edges being welded together for rigidity, and said second sidewall being bent uniformly, longitudinally, toward said first sidewall, to recess the weld between the longitudinal edges of said second sidewall, whereby said edges may be evenly aligned and abutted with and welded to the first sidewall of an adjacent member to assemble a floor comprising a desired number of said members.

References Cited by the Examiner

UNITED STATES PATENTS

| | | | |
|---|---|---|---|
| 514,233 | 2/94 | Kubach | 20—91 |
| 871,222 | 11/07 | Higgin | 189—40 |
| 1,075,845 | 10/13 | Mills | 20—91 |
| 1,102,693 | 7/14 | Seyler | 20—91 |
| 2,041,004 | 5/36 | Levan | 153—1 |
| 2,112,480 | 3/38 | Coddington | 189—37 |
| 2,167,835 | 8/39 | Greulich | 189—40 |
| 2,253,639 | 8/41 | McMahan | 153—1 |
| 2,278,554 | 4/42 | Morton | 94—5 |
| 2,387,226 | 10/45 | Bonsall | 105—422 |
| 2,820,422 | 1/58 | Peterson | 20—6 |
| 2,900,055 | 8/59 | Shaver | 189—34 |
| 2,955,687 | 10/60 | Seim | 189—34 |

FOREIGN PATENTS 5,130   1912   Great Britain

JACOB L. NACKENOFF, *Primary Examiner.*

LEO QUACKENBUSH, WILLIAM I. MUSHAKE,
*Examiners.*